C. LARSON.
SAW HANDLE AND BLADE CONNECTION.
APPLICATION FILED FEB. 28, 1921.
1,405,925. Patented Feb. 7, 1922.
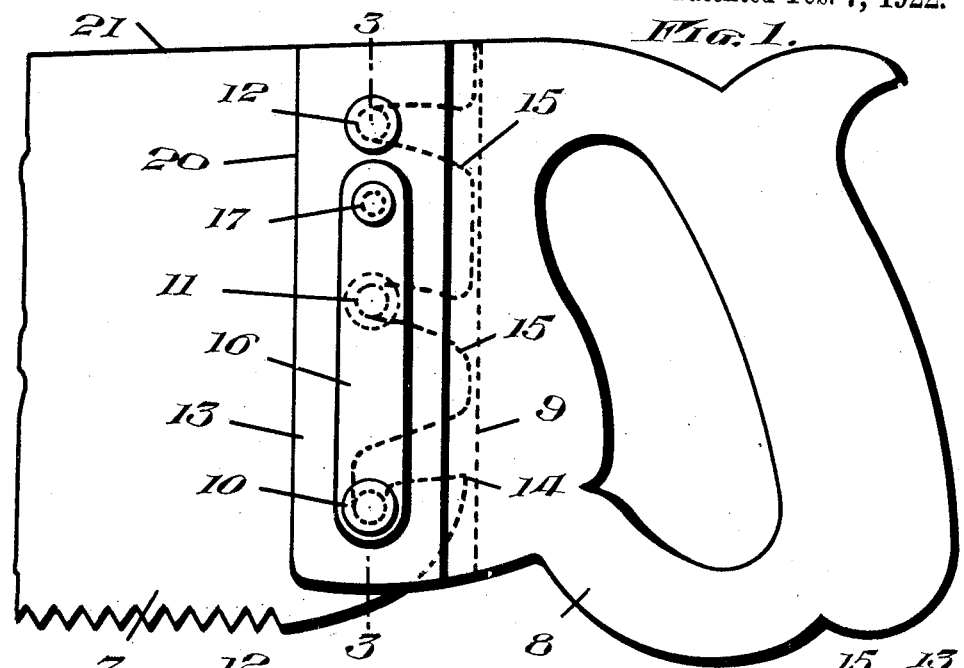
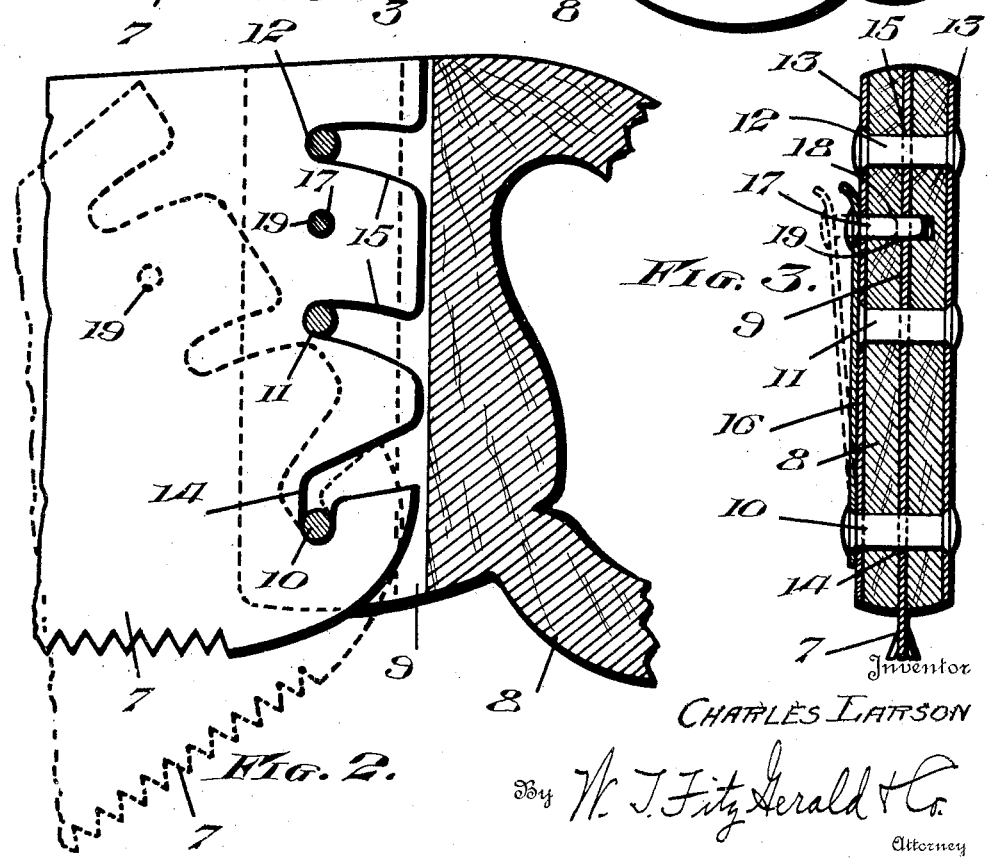
Charles Larson
By W. J. FitzGerald & Co.
Attorney

UNITED STATES PATENT OFFICE.

CHARLES LARSON, OF BURLINGTON, IOWA.

SAW HANDLE AND BLADE CONNECTION.

1,405,925.  Specification of Letters Patent.  Patented Feb. 7, 1922.

Application filed February 28, 1921. Serial No. 448,416.

*To all whom it may concern:*

Be it known that I, CHARLES LARSON, a citizen of the United States, residing at Burlington, in the county of Des Moines and State of Iowa, have invented certain new and useful Improvements in Saw Handle and Blade Connections; and I do hereby declare the following to be a full, clear, and exact description of the invention, such as will enable others skilled in the art to which it appertains to make and use the same.

The present invention relates to saws and similar implements, and aims to provide a novel and improved detachable connection between the blade and handle, whereby said parts can be readily separated and the handle used for a number of different blades.

Another object is the provision of novel interengagable portions on the blade and handle, providing for the convenient bringing together of said parts, and the rigid or firm attachment thereof to one another.

A further object is the provision of such an implement in which the blade has slots formed to engage rivets or similar members of the handle, for attaching the blade and handle together in a novel manner, and means for preventing accidental detachment.

It is also an object of the invention to provide such a device which is simple and inexpensive in construction, as well as practical and efficient in use.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of the saw showing the improvements embodied therein, a portion of the blade being broken away.

Fig. 2 is a fragmentary view showing the handle in section with the blade in the kerf or slot thereof, and illustrating in dotted lines the position of the blade when attaching it to or detaching it from the handle.

Fig. 3 is a cross section on the line 3—3 of Fig. 1.

The handle end of the saw blade 7 is attached to the handle 8 by fitting such end portion of the blade in a kerf or slot 9 provided in the handle between the sides thereof, and for the purpose of securing the blade to the handle, rivets 10, 11 and 12 or similar members are engaged transversely through the handle at points spaced longitudinally of the slot 9, and said rivets extend transversely through said slot. The handle 8 is made of wood, as usual, and transverse metal plates 13 bear against the opposite sides of said handle for the swaging of the rivets. The handle end of the blade 7 has a bayonet or angular slot 14 to engage the rivet 10, and also has arcuate slots 15 to engage the rivets 11 and 12, and the tail of the slot 14 extends away from the slots 15, while the slots 15 are curved around a center lying within the tail of said slot 14. This provides for the attachment of the blade and handle by a relative swinging movement thereof with respect to one another in their common plane. Thus, by positioning the blade and handle in the same plane at an angle with one another (the handle in the full line position and the blade in the dotted line position, as shown in Fig. 2), they can be moved together to bring the end of the blade into the slot 9 and to move the rivet or member 10 into the slot 14, after which the blade and handle are shifted edgewise to move the rivet 10 into the tail of the slot 14. The blade and handle are then swung relatively to one another on the rivet 10 as a pivot, whereby the rivets 11 and 12 move into the slots 15 as the handle and blade are moved together. The slots 15 in engaging the rivets 11 and 12 will prevent the edgewise movement of the blade and handle relatively to one another, and the rivet 10 engaging within the tail of the bayonet slot 14 will prevent the corresponding edges of the blade and handle from separating, thereby requiring a swinging movement of the parts on the rivet 10 in order to separate them. As shown, the slot 14 and rivet 10 are at the lower end of the slot 9 and near the lower or toothed edge of the blade, and the pressure on the handle 8 during the use of the saw, will be in a direction opposite to that in which the saw is broken when separating the blade and handle. If desired, the intermediate rivet 11 and intermediate slot 15 can be eliminated, when only two rivets in the handle are wanted.

In order to prevent the accidental separation of the blade and handle, a spring catch is provided including a leaf spring 16 having one end secured by one end of the rivet 10 to the plate 13 at one side, and said spring extends transversely of the saw across the end of the rivet 11. A pin 17 is secured to the free end portion of the spring and slides within an aperture 18 formed in the handle between the rivets 11 and 12. The blade 7 is formed with an aperture 19 between the slots 15 to register with the aperture 18 when the blade and handle are swung together, thereby permitting the pin 17 to snap through the aperture 19 of the blade, so as to retain the blade in the kerf or slot 9 of the handle. By springing the free end of the spring 16 away from the handle, the pin 17 is readily drawn from the aperture 19, thereby permitting the joint between the blade and handle to be broken, to swing them away from one another on the rivet 10 as a pivot, and the rivets 11 and 12 being removed from the slots 15 will now permit the blade 7 to be shifted edgewise to remove the rivet 10 from the tail of the slot 14 and permit longitudinal separation of the blade and handle.

The blade and handle are thus readily separated, which will permit of the use of a number of blades with the same handle, including blades of different styles for various kinds of work.

The saw can also be used as a try-square, by having the edge 20 of the handle at right angles with the straight edge 21 of the blade.

Having thus described the invention, what is claimed as new is:—

1. An implement comprising a handle having a kerf, members carried by the handle extending transversely through said kerf, a blade having an end to fit in said kerf, having a bayonet slot extending from said end to engage one of said members and another slot extending from said end of the blade to engage the other member, the tail of the bayonet slot extending transversely of the blade, the second named slot being curved around a point within the tail of the bayonet slot for the entrance of the second named member, so that when the blade is inserted in said kerf and the first named member engaged in the tail of the bayonet slot, the handle and blade can be swung in the plane thereof to bring them together and move the second named member in the second named slot, and means for holding the handle and blade together against the swinging movement away from one another.

2. An implement comprising a handle having a kerf, rivets extending transversely through the handle and across said kerf, a blade having an end to fit in said kerf, having a bayonet slot extending from said end to engage one of said rivets and another slot extending from said end to engage the other rivet, the tail of the bayonet slot extending transversely of the blade and the second-named slot being curved around a point within the tail of the bayonet slot for the entrance of the second named member, so that when the blade is inserted in said kerf and the first named rivet engaged in the tail of the bayonet slot, the handle and blade can be swung together to bring the second named rivet in the second named slot, and a leaf spring secured flatly to one side of the handle by one of said rivets and having a pin slidable transversely in the handle to engage through said blade for preventing the handle and blade from swinging apart.

In testimony whereof I have signed my name to this specification in the presence of two subscribing witnesses.

CHARLES LARSON.

Witnesses:
Jno. M. Mercer,
Margaret J. Mercer.